Dec. 28, 1954  J. R. BARNES  2,698,093
TRAY FOR AUTOMOBILES OR THE LIKE
Filed May 9, 1952
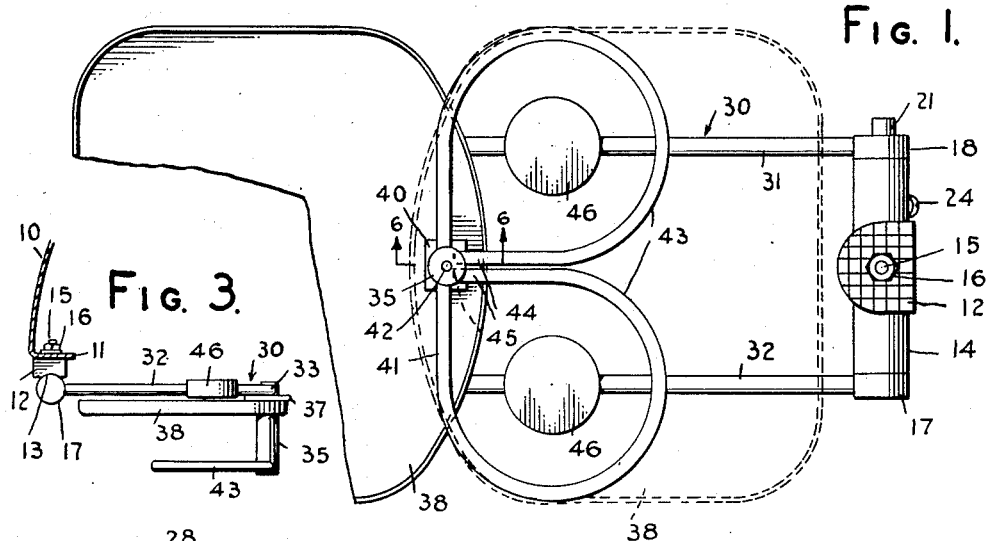
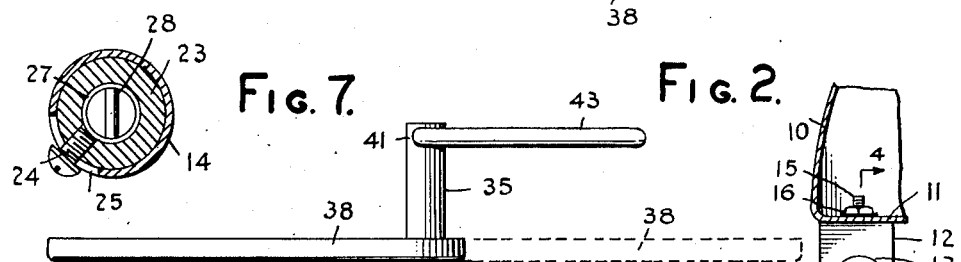
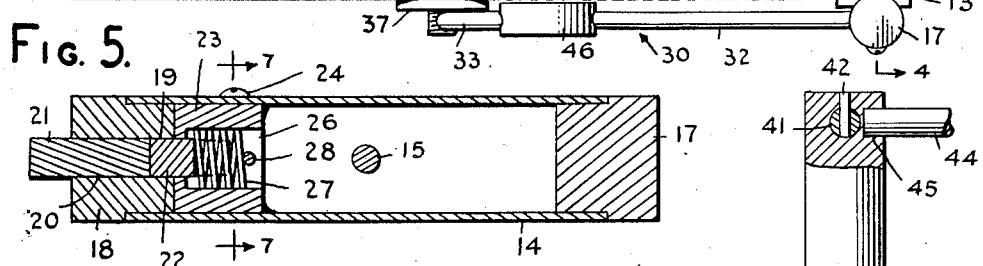
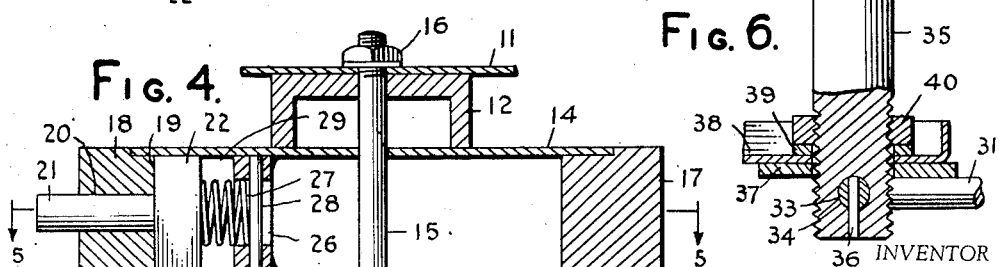
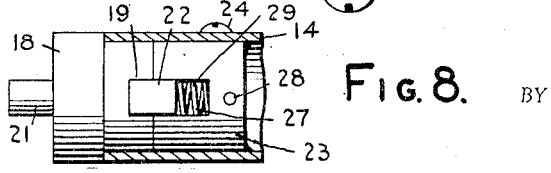
INVENTOR
JOHN R. BARNES
BY
ATTORNEY

2,698,093

TRAY FOR AUTOMOBILES OR THE LIKE

John R. Barnes, Ward, S. C.

Application May 9, 1952, Serial No. 286,993

1 Claim. (Cl. 211—74).

My invention relates to a service tray or support to be mounted upon an automobile instrument panel or the like.

A primary object of the invention is to provide an automobile service tray of the above-mentioned character which is shiftable to a substantially concealed position under the instrument panel, and well out of the way of passengers while not in use, the tray being adapted to extend rearwardly of the instrument panel, for supporting drinks, sandwiches and other articles in a convenient position to use while the automobile is in motion or at rest.

A further object of the invention is to provide a device of the above-mentioned character which when folded to the inoperative position will occupy a minimum of space.

A further object is to provide in a device of the above-mentioned character a tray or sandwich support which is adjustable with respect to the remainder of the support.

A still further object of the invention is to provide an automobile service tray having a positive locking device for positioning the tray in either the operative or inoperative positions.

Other objects and advantages of the invention will be apparent during the course of the following description.

In the accompanying drawings forming a part of this application, and in which like numerals are employed to designate like parts throughout same, Figure 1 is a plan view of a service tray embodying my invention, Figure 2 is a side elevation of the tray, applied to the instrument panel of an automobile, the tray and associated elements being shifted to the outer or opened position, Figure 3 is a similar view, the tray and associated elements being shifted to the inner or closed position, Figure 4 is an enlarged vertical section on the line 4—4 of Figure 2, Figure 5 is a horizontal section taken on line 5—5 of Figure 4, Figure 6 is an enlarged fragmentary vertical section taken on line 6—6 of Figure 1, Figure 7 is a transverse vertical section on line 7—7 of Figure 5, and Figure 8 is a fragmentary horizontal section taken on line 5—5 of Figure 4 with parts shown in elevation.

In the drawings, where for the purpose of illustration is shown a preferred embodiment of my invention, the numeral 10 designates the instrument panel of an automobile, and including a bottom horizontal flange or projection 11 which extends forwardly and under the instrument panel and away from the occupants in the front seat of the automobile.

I utilize the horizontal flange 11 for connecting my service tray with the instrumental panel. An adaptor or block 12 engages the bottom of the flange 11 and is provided in its bottom with an arcuate recess 13, receiving a horizontal sleeve or tube 14 which extends below the flange 11, longitudinally of the instrument panel. Aligned vertical openings in the sleeve 14 and adapter 12 receive an upwardly directed bolt 15, which also passes through an aperture in the flange 11, and has a nut 16 provided on its upper end and above the flange 11 for detachably rigidly securing the adapter 12 and sleeve 14 to the instrument panel. The bolt 15 prevents the sleeve 14 from rotating upon its longitudinal axis.

One end of the sleeve 14 has a trunnion 17 rotatably mounted therein, and the opposite end of the sleeve rotatably receives a companion trunnion 18, having a groove or slot 19 formed in its inner end, and extending diametrically therethrough. A central axial bore 20 is likewise formed in the trunnion 18 and extends through its opposite ends. A push button or plunger 21 is slidably mounted within the bore 20 for reciprocation and has its outer end extending beyond the outer end of the trunnion 18, as shown. A transverse rectangular key or block 22 is rigidly secured to the inner end of the plunger 21, and is slidably engageable in the groove 19. An intermediate member or cylinder 23 is mounted within the sleeve 14, just inwardly of the trunnion 18, and secured in place by a radial set screw 24 extending through a circumferential slot 25 in the sleeve 14. The slot 25 permits of some circumferential adjustment of the cylinder 23 within the sleeve 14, and prevents any longitudinal movement of the cylinder within the sleeve. The cylinder is provided in its inner end with an opening or bore 26, within which is mounted a compressible coil spring 27, held therein by a transverse pin 28, carried by the cylinder 23 near its inner end. The cylinder 23 is provided in its outer end with a slot or groove 29 extending diametrically therethrough and being of the same width, but at least twice the axial depth of the slot 19. The slot 29 registers with the slot 19, and slidably receives the rectangular key 22. The outer end of the spring 27 engages the key 22, and urges it outwardly into normal engagement with the trunnion 18.

The width of the key 22, as viewed in Figure 4 is approximately twice the axial depth of the slot 19, and the key normally engages both of the slots 19 and 29 as shown in Figures 4 and 8 for releasably locking the trunnion 18 against rotation in the sleeve 14. The width of the key 22, as viewed in Figure 4 is preferably the same as or slightly less than the axial depth of the slot 29, so that when the plunger 21 is forced inwardly, the key will shift out of the slot 19 and enter the deeper slot 29, the spring 27 then being compressed. This will free the trunnion 18 for rotation within the sleeve 14. When the plunger 21 is released, the spring 27 returns it and the key 22 to the outer position shown in the drawings, where the key 22 engages both of the slots 19 and 29.

A U-shaped holder or yoke 30 is provided, and includes spaced parallel arms 31 and 32, rigidly secured to the trunnions 18 and 17 respectively, beyond the ends of the sleeve 14. The arms 31 and 32 are arranged at right angles to the longitudinal axis of the sleeve 14, as shown. The outer transverse end 33 of the U-shaped yoke 30 extends through an opening 34 formed near the lower screw threaded end of a vertical post or rod 35. The post 35 is arranged at right angles to the arms 31 and 32 and extends above the U-shaped yoke 30 when the same extends horizontally rearwardly of the instrument panel 10, in the operative position. The post 35 is held against turning on the yoke 32 by a dowel pin 36 in the lower end of the post, Figure 6. A flat washer 37 is mounted upon the post 35 above the transverse yoke end 33, and a sheet metal serving tray 38 is arranged above the flat washer 37, and slidably contacts the same and has an opening near its forward end receiving the post 35. A fibre washer 39 is mounted upon the post 35 above the tray 38, and the tray and fibre washer are clamped against the washer 37 by a nut 40, carried by the lower screw threaded end of the post 35. The nut 40 is adjustable to render the service tray 38 rotatable upon the post 35, with enough friction caused by the fibre washer 39 to cause the service tray to remain in a selected adjusted position.

As shown in Figures 2 and 3, the service tray 38 is adapted to extend rearwardly of the post 35 and yoke 30 to support sandwiches or the like. The tray is also swingable to the broken line position in Figures 2 and 3, wherein it extends forwardly of the post 35, and over the horizontal arms 31 and 32.

Near the top end of the post 35, the same has a transverse opening, receiving a transverse rod 41 which is horizontal and arranged at right angles to the arms 31 and 32. The rod 41 extends equidistantly upon opposite sides of the post 35, and the rod is held against rotation relative to the post by a dowel pin 42 in the upper end of the post, Figure 6. The rod 41 is bent at its outer ends for forming relatively large horizontal circularly curved loops 43 integral therewith, having a combined width substantially equal to the width of the tray 38, and adapted to overlie the tray when the same is in the dotted line position shown in Figures 2 and 3. The free ends 44 of the loops 43 are disposed in parallel relation midway between the arms 31 and 32, and are anchored within openings 45 formed in the forward side of the post 35, Figures 2 and 6. The loops 43 are substantially rigid, and large enough to receive drinking glasses, soft drink bottles, beer bottles and the like.

When the tray 38 is in the forward dotted position shown in Figure 2, the bottoms of the glasses or the like in the loops 43 are supported by the tray. When the tray is swung to the rearmost full line position of Figure 2, for supporting sandwiches or the like, the bottoms of the glasses will rest upon discs or plates 46, rigidly mounted upon the arms 31 and 32 directly below the loops.

In use, the device is fastened to the instrument panel flange 11 as previously described, and the trunnions 17 and 18 and cylinder 23 are adjusted circumferentially within the fixed sleeve 14, by means of the set screw 24, until the yoke 30 is horizontal. When this condition is achieved, the set screw 24 is tightened, and the device is ready for use. The companion locking grooves 19 and 29 are now vertical.

With the tray in the operative position shown in full lines in Figure 1, the same is horizontally disposed and extends rearwardly of the instrumental panel 10 and toward the occupants of the front seat of the automobile. The key 22 is engaged in both slots 19 and 29, and the trunnion 18 and yoke 30 are locked against rotation relatively to the sleeve 14. The device is now used for supporting drinks, sandwiches and the like, in the manner previously mentioned, with the tray 38 in either the full line or dotted line positions, Figure 2, or in any preferred intermediate position.

When it is desired to swing the device to the stowed position under the instrument panel 10, and forwardly thereof, as shown in broken lines in Figure 1, it is merely necessary to press the plunger 21 inwardly for moving the key 22 entirely out of the slot 19 and into the slot 29. This will free the trunnion 18 for rotation within the sleeve 14, and the service tray is now swung downwardly in a counterclockwise direction, Figure 1, and up under the instrument panel 10 to the broken line position of Figure 1. When the device has been swung through 180 degrees the spring pressed key 22 will snap back into the slot 19 for releasably locking the device in the stowed position. When in the stowed position, the tray 38 is disposed next to the arms 31 and 32, or in the position shown in Figures 2 and 3. With this arrangement, the device is relatively short and occupies a minimum of space forwardly of the instrument panel.

To return the device to the operative position shown in full lines in Figure 1, the plunger 21 is pressed inwardly for disengaging the key 22 from the slot 19, and the device is swung forwardly for a full 180 degrees, in which position the key 22 will again drop into the slot 19 and lock the device in the operative position.

My service tray is highly compact, easy to install and operate, sturdy and durable and cheap to manufacture.

It provides an attractive and highly convenient accessory for an automobile, and its installation requires no material alteration of the instrument panel. The device may be readily installed in practically any automobile.

It is to be understood that the form of the invention herewith shown and described is to be taken as a preferred example of the same, and that various changes in the shape, size and arrangement of parts may be resorted to, without departing from the spirit of the invention or scope of the subjoined claim.

Having thus described my invention, I claim:

A mounting for an automobile service tray or the like comprising a substantially horizontal sleeve to be secured to the bottom of an automobile instrument panel and having its opposite ends open, trunnions journaled within the ends of the sleeve for rotation, one trunnion being freely rotatable within the sleeve, the other trunnion having a longitudinal bore extending therethrough and being provided in its inner end with a groove extending diametrically therethrough, a finger operated plunger slidable within the bore of the trunnion for reciprocation and normally projecting beyond the outer end of the trunnion and the adjacent end of the sleeve, a key rigidly secured to the inner end of the plunger and extending diametrically of the plunger and trunnion and engageable within the groove of the trunnion, said key being substantially wider than the depth of said groove, a plug fixedly mounted within the sleeve adjacent the trunnion having a groove and substantially contacting such trunnion and provided in its outer end with a companion diametrical groove substantially deeper than the groove of the trunnion and adapted to receive and house the entire key when the finger operated plunger is shifted inwardly to disengage the key from the groove of the trunnion, said plug having an opening in its inner end leading into the groove of the plug, a compressible coil spring mounted within the opening of the plug and engaging the key to maintain the same normally in locking engagement with the grooves of the trunnion and plug, the grooves and key then serving to releasably lock the trunnions against rotation within the sleeve, a bolt extending transversely of the sleeve intermediate said trunnions and securing the sleeve to the bottom of the automobile instrument panel, and service tray supporting means secured to the trunnions and adapted to rotate therewith substantially 180 degrees when the plunger is shifted inwardly by the finger to disengage the key from the groove of the trunnion and release the trunnions for rotation.

References Cited in the file of this patent

UNITED STATES PATENTS

| Number | Name | Date |
|---|---|---|
| 181,514 | York | Aug. 22, 1876 |
| 1,315,578 | Rock | Sept. 9, 1919 |
| 2,356,131 | Tracy | Aug. 22, 1944 |
| 2,454,889 | Shelton et al. | Nov. 30, 1948 |
| 2,468,987 | Le Moyne | May 3, 1949 |
| 2,510,436 | Trammell | June 6, 1950 |
| 2,526,322 | Black | Oct. 17, 1950 |
| 2,602,600 | Kappeler | July 8, 1952 |